(12) United States Patent
Bae et al.

(10) Patent No.: US 11,364,823 B2
(45) Date of Patent: Jun. 21, 2022

(54) SEAT DEVICE FOR VEHICLE

(71) Applicant: DAYOU HOLDINGS CO., LTD., Gwangju (KR)

(72) Inventors: Ji Sung Bae, Gyeonggi-do (KR); Dae Keon Jang, Gyeonggi-do (KR); Hyung Sun Park, Gyeonggi-do (KR)

(*) Notice: Subject to any disclaimer, the term of this patent is extended or adjusted under 35 U.S.C. 154(b) by 7 days.

(21) Appl. No.: 16/768,007

(22) PCT Filed: Feb. 15, 2019

(86) PCT No.: PCT/KR2019/001892
§ 371 (c)(1),
(2) Date: May 28, 2020

(87) PCT Pub. No.: WO2019/164193
PCT Pub. Date: Aug. 29, 2019

(65) Prior Publication Data
US 2021/0402895 A1    Dec. 30, 2021

(30) Foreign Application Priority Data

Feb. 20, 2018  (KR) ........................ 10-2018-0019959
Nov. 20, 2018  (KR) ........................ 10-2018-0143214

(51) Int. Cl.
*B60N 2/36*    (2006.01)
*B60N 2/30*    (2006.01)

(52) U.S. Cl.
CPC ........... *B60N 2/309* (2013.01); *B60N 2/3093* (2013.01); *B60N 2/36* (2013.01)

(58) Field of Classification Search
CPC .... B60N 2/309; B60N 2/3075; B60N 2/3093; B60N 2/36
See application file for complete search history.

(56) References Cited

U.S. PATENT DOCUMENTS

| 7,328,929 B2* | 2/2008 | Epaud | B60N 2/3009 296/65.09 |
| 8,267,457 B2* | 9/2012 | Yamada | B60N 2/3047 296/65.01 |

(Continued)

FOREIGN PATENT DOCUMENTS

| JP | 2010126033 | 6/2010 |
| KR | 20130063910 | 6/2013 |

(Continued)

*Primary Examiner* — Philip F Gabler
(74) *Attorney, Agent, or Firm* — Schmeiser, Olsen & Watts, LLP

(57) ABSTRACT

Provided is a vehicle-seat apparatus including: a front link whose upper end portion is connected to a front portion of a seat cushion; a sliding member connected to a lower end portion of the front link; a sliding guidance member installed on a bottom surface of the accommodation space to extend backward and forward and thus to guide linear backward and forward movements of the sliding member; an L-shaped main link whose front end portion is connected to a body of the front link and whose rear upper end portion is connected to a lower end portion of a seat back; a fixation bracket installed on an upper end portion of a rear wall of the accommodation space; and a rear support link whose front upper end portion is connected to a rear portion of the seat cushion, and whose rear lower end portion is connected to the fixation bracket.

7 Claims, 11 Drawing Sheets

(56) References Cited

U.S. PATENT DOCUMENTS

| | | | | |
|---|---|---|---|---|
| 8,474,910 | B2* | 7/2013 | Kammerer | B60N 2/3031 |
| | | | | 297/334 |
| 8,931,844 | B2* | 1/2015 | Line | B60N 2/3013 |
| | | | | 297/378.1 |
| 9,283,873 | B2* | 3/2016 | Line | B60N 2/3065 |
| 9,643,519 | B2* | 5/2017 | Nakamura | B60N 2/3047 |
| 10,829,014 | B2* | 11/2020 | Sivaraj | B60N 2/757 |

FOREIGN PATENT DOCUMENTS

| | | |
|---|---|---|
| KR | 20140027408 | 3/2014 |
| KR | 101406449 | 6/2014 |
| KR | 20140108766 | 9/2014 |

\* cited by examiner

[FIG. 1]
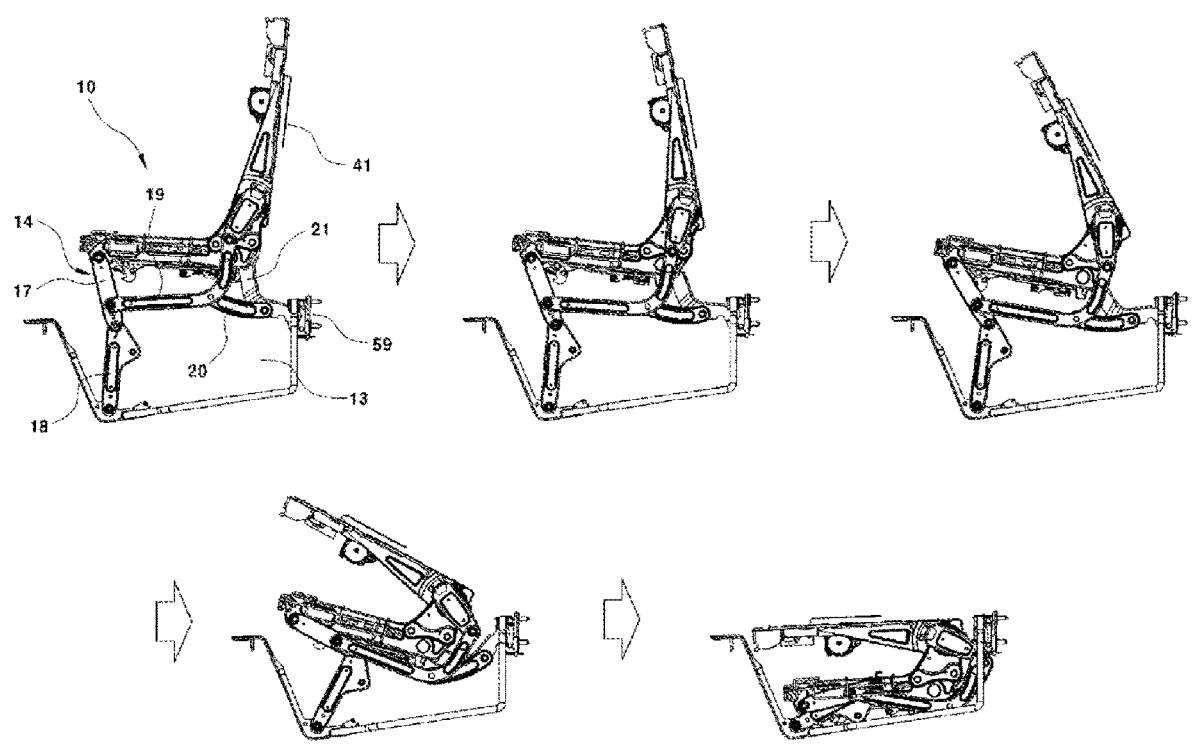

[FIG. 2]
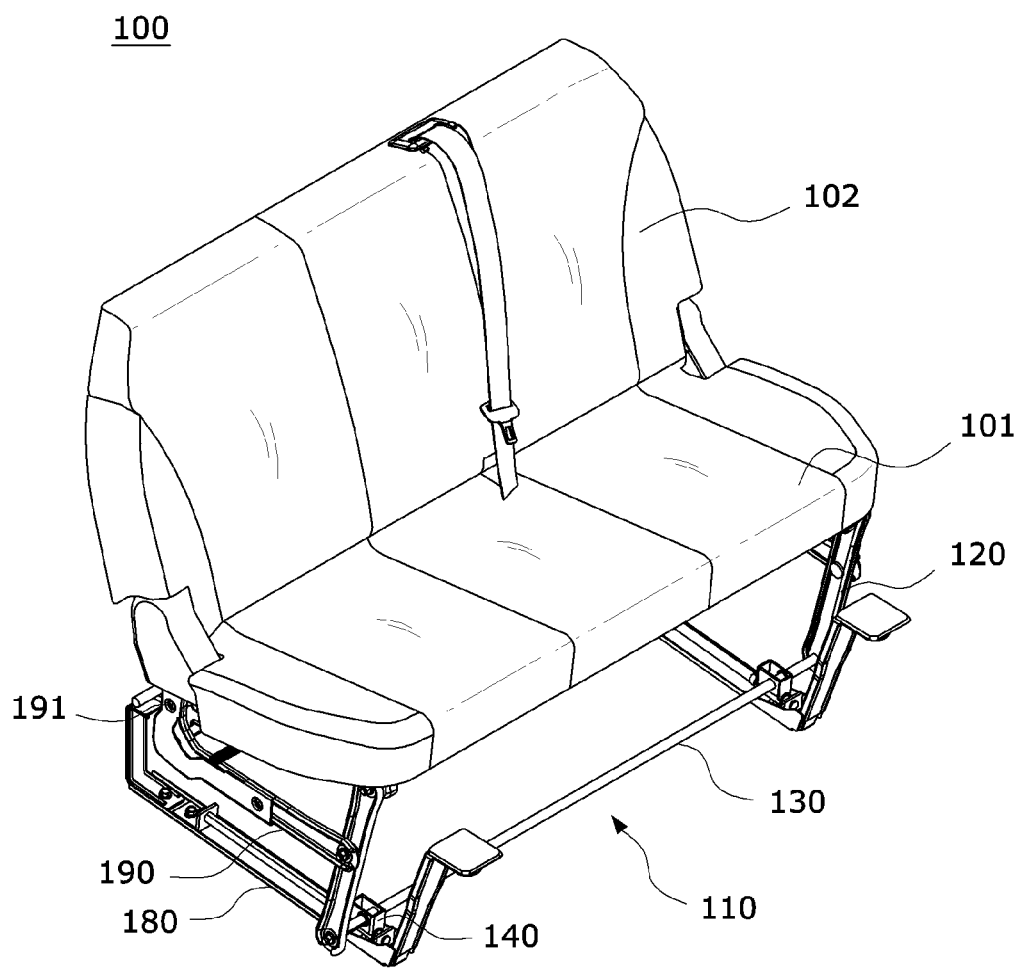

[FIG. 3]
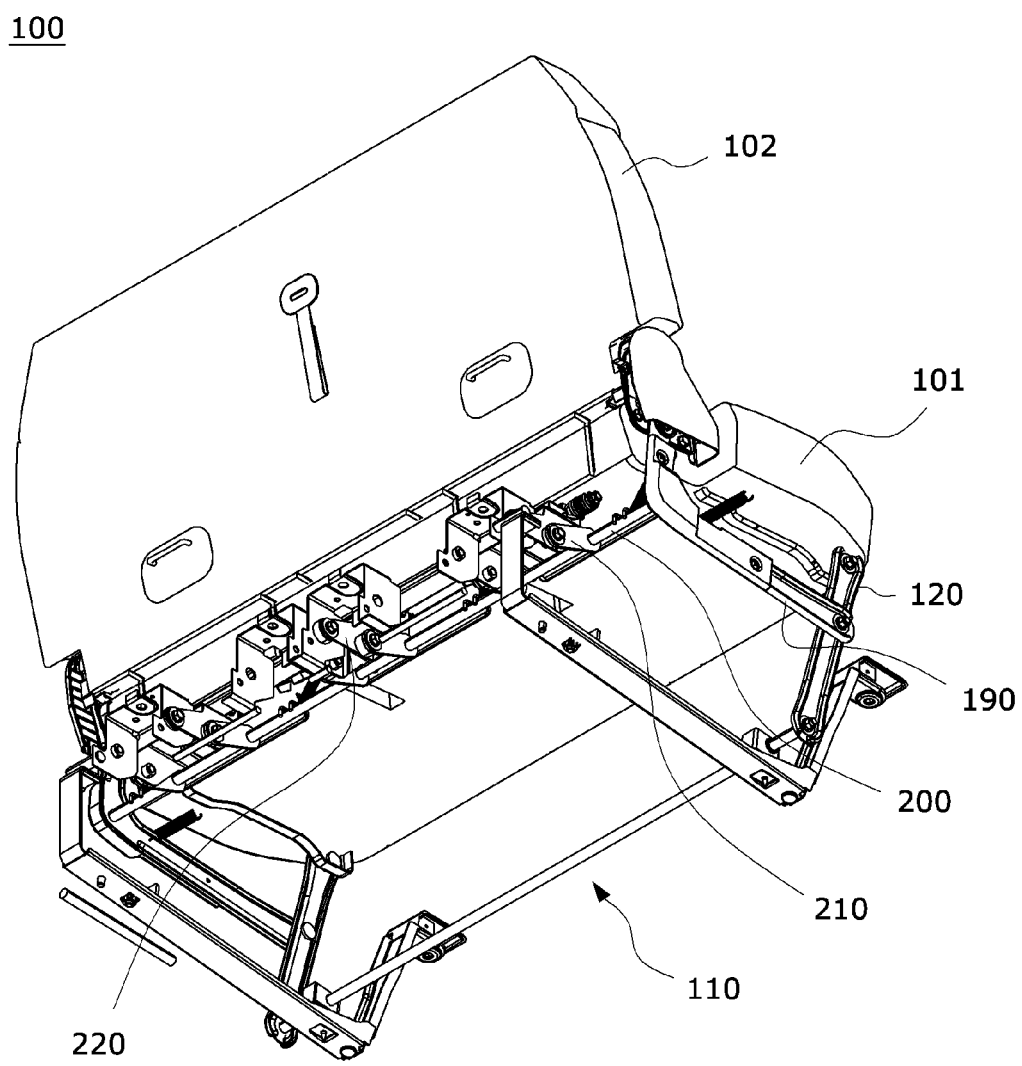

[FIG. 4]
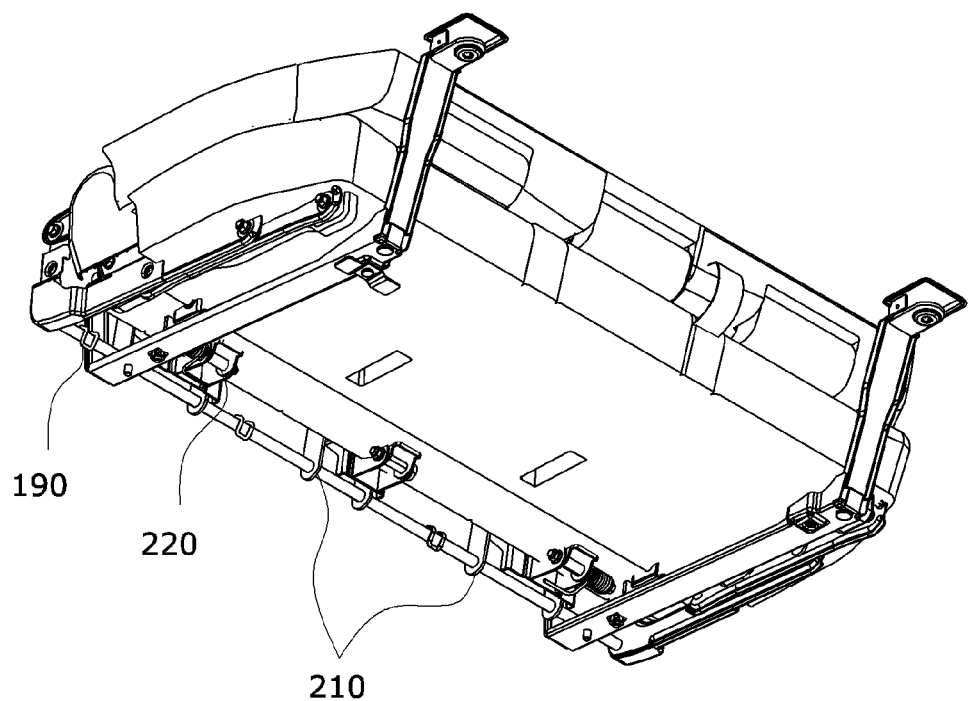

[FIG. 5]
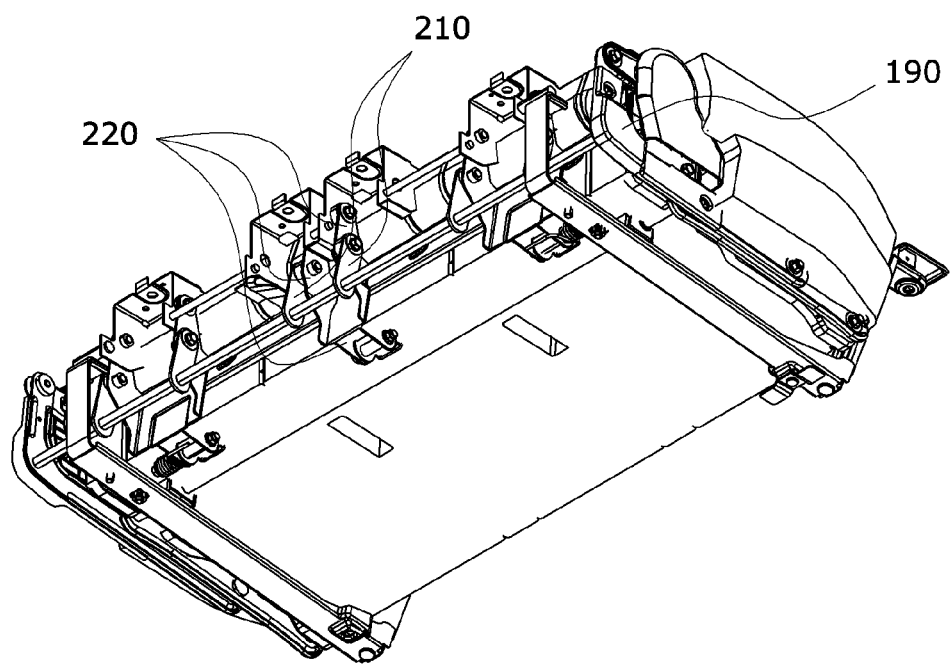

[FIG. 6]
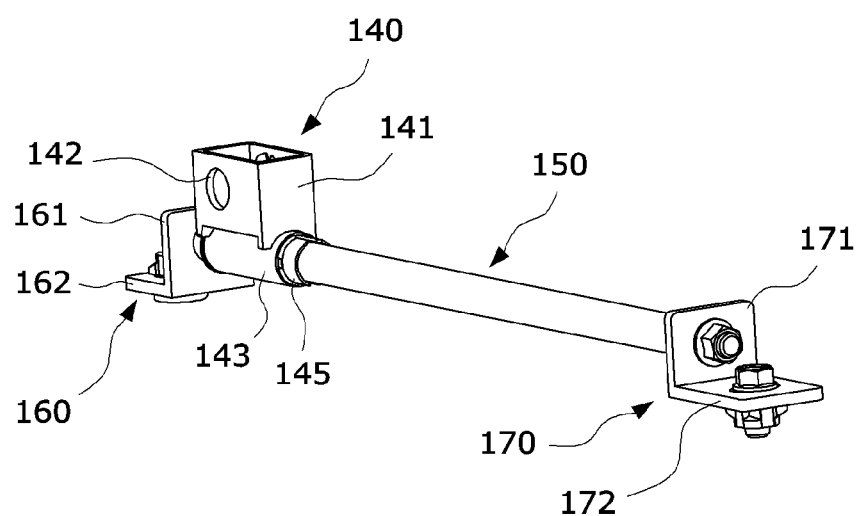
[FIG. 7]
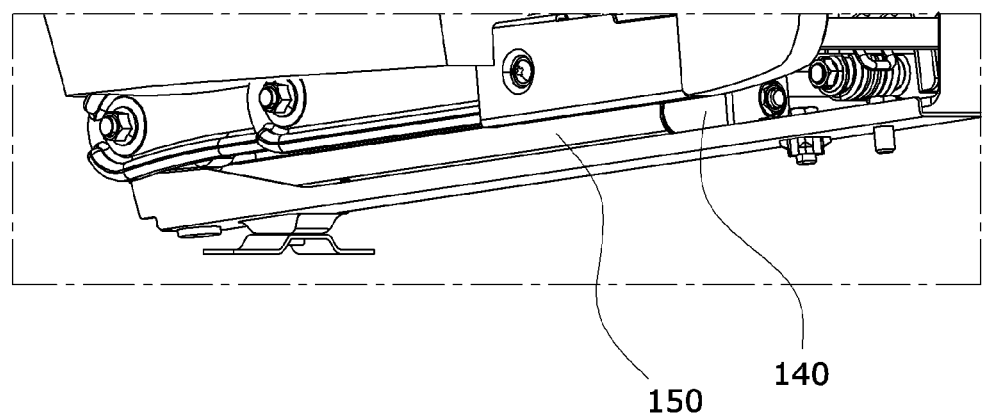

[FIG. 8]
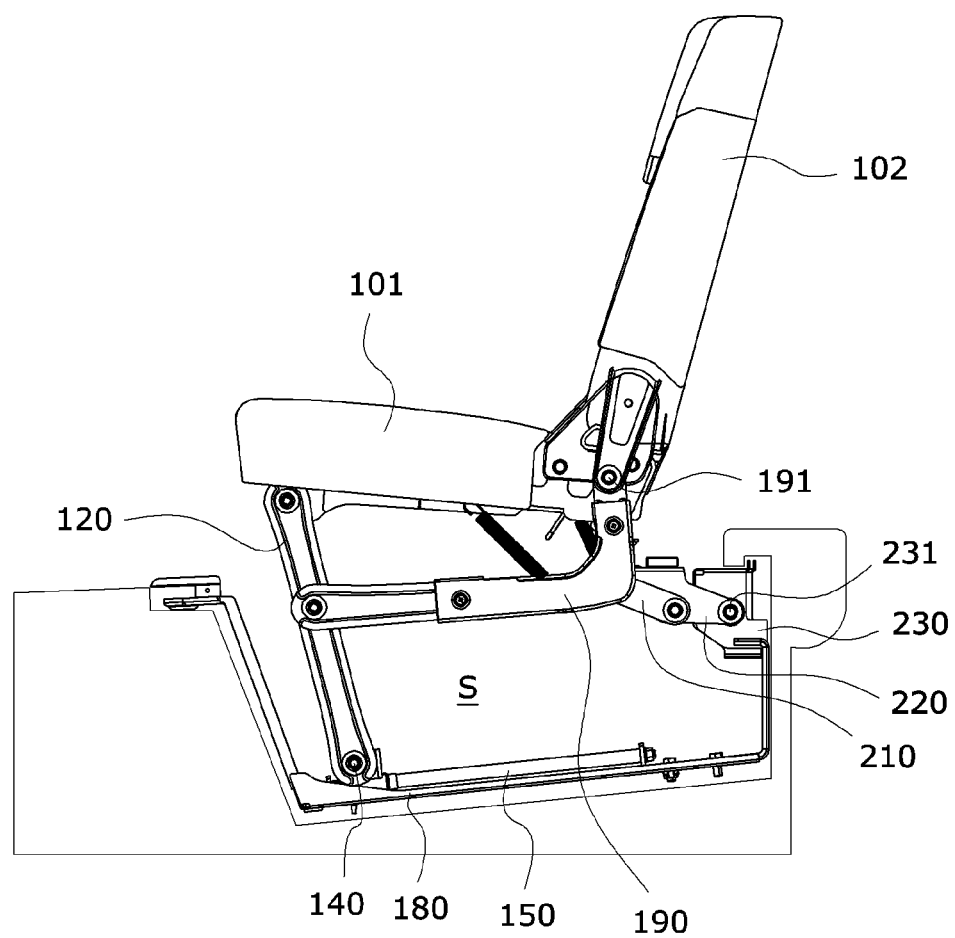

[FIG. 9]
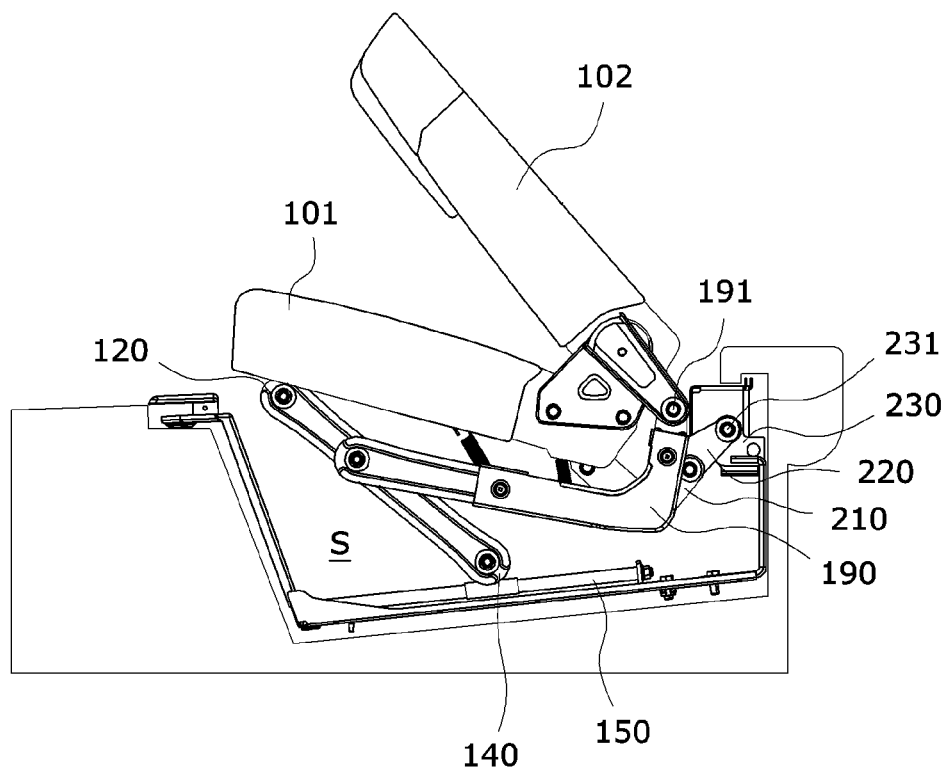

[FIG. 10]
100
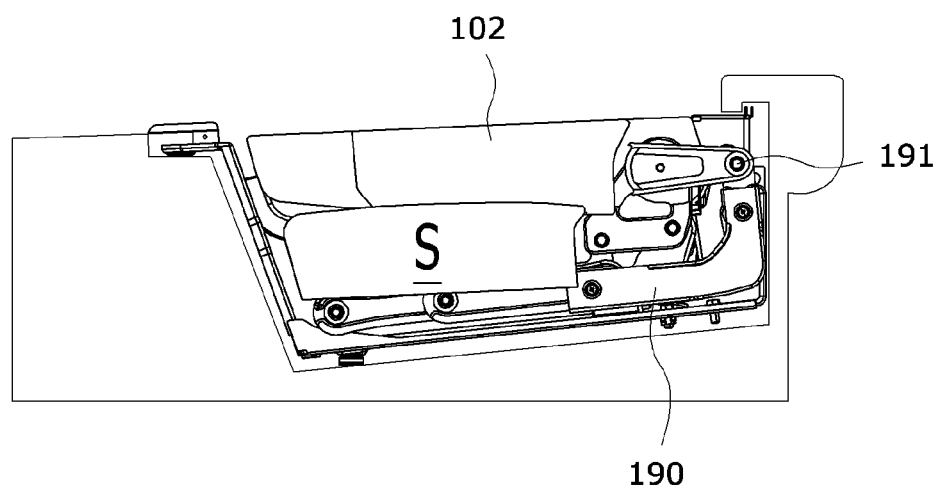

[FIG. 11]
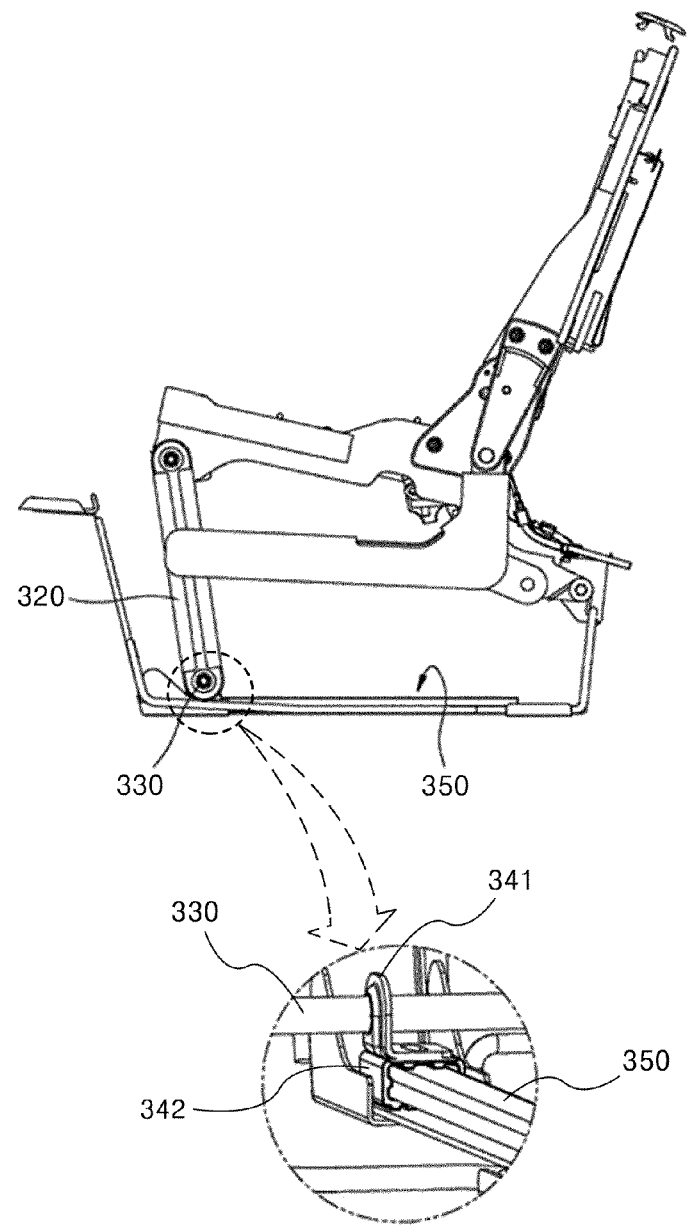

[FIG. 12]
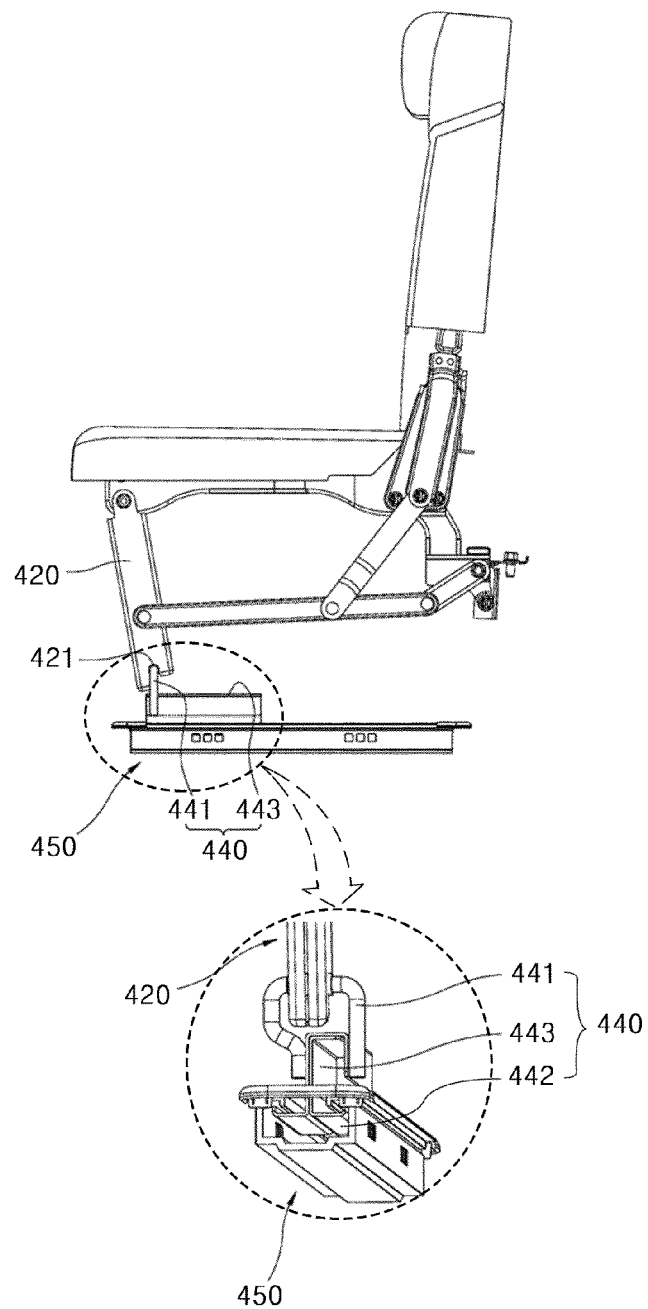

SEAT DEVICE FOR VEHICLE

TECHNICAL FIELD

The present invention relates to a vehicle-seat apparatus that is mounted on a vehicle seat and thus makes it possible to easily fold the vehicle seat and to accommodate the folded vehicle seat into an accommodation space thereunder.

BACKGROUND ART

In the related art, there have been provided seating apparatuses that make it possible to fold a rear vehicle seat in the second row, the third row, and so on and to accommodate the folded rear vehicle seat into an accommodation space provided under or behind the rear vehicle seat in order to secure an expanded space for loading baggage.

Particularly, an example of the related art is Korean Patent No. 10-1534908 titled "APPARATUS FOR ACCOMMODATING VEHICLE SEAT" (issued on Jul. 1, 2015) directed to a seating apparatus that makes it possible to fold a seat and to accommodate the folded seat into an accommodation space provided under the seat, as is the case with the invention in the present application. As illustrated in FIG. 1 in Korean Patent No. 10-1534908, a front link in front is divided into an upper link 17 and a lower link 18, and when a seat is folded or unfolded, the respective outermost end portions of the upper and lower links 17 and 18 are brought into contact with each other or are separated from each other. Thus, there is a concern that the stability of the seat in the unfolded state will be decreased. There is room for a movement of a hinge portion that is a point that connects between the upper and lower links 17 and 18. As a result, the problem of shaking the seat in an unfolded state occurs.

DISCLOSURE

Technical Problem

The objective of the present invention is to provide a vehicle-seat apparatus that is capable of securing the stability of a seat and preventing the seat from shaking.

Technical Solution

In order to achieve the objective described above, according to an aspect of the present invention, there is provided a vehicle-seat apparatus that is installed in a vehicle seat having a seat cushion that is horizontally installed and a seat back that extends upward from a rear end portion of the seat cushion and is capable of rotating forward with respect to the seat cushion, the vehicle-seat apparatus including: a front link of which an upper end portion is hingedly coupled to a front portion of the seat cushion; a sliding member that is hingedly coupled to a lower end portion of the front link; a sliding guidance member that is fixedly installed on a bottom surface of an accommodation space formed under the vehicle seat, in such as manner as to extend backward and forward, and guides linear backward and forward movements of the sliding member; an L-shaped main link of which a front end portion is hingedly coupled to a body of the front link and of which a rear upper end portion is hingedly coupled to a lower end portion of the seat back; a fixation bracket that is fixedly installed on an upper end portion of a rear wall of the accommodation space; and a rear support link of which a front upper end portion is hingedly coupled to a rear portion of the seat cushion, and of which a rear lower end portion is hingedly coupled to the fixation bracket.

In the vehicle-seat apparatus, a shaft support portion, extending transversely, that is hingedly coupled to the lower end portion of the front link and a sleeve, extending backward and forward, that is integrally combined with the shaft support portion may be formed in the sliding member and on the sliding member, respectively, and the sliding guidance member may be a guidance shaft that, for insertion, passes through the sleeve.

The vehicle-seat apparatus may further include comprising an intermediate link of which a front end portion is hingedly coupled to a rear lower end portion of the main link and of which a rear end portion is hingedly coupled to a body of the rear support link, and which thus causes the rear support link to pivot on the fixation bracket according to ascending and descending movements of the main link.

The vehicle-seat apparatus may further include an intermediate sleeve, formed of synthetic resin, that is inserted into an internal space of the sleeve on the sliding member, thereby being combined therewith and thus serves as a connection between the sleeve and the guidance shaft.

The vehicle-seat apparatus may further include a base frame that is installed on a bottom surface of the accommodation space in such a manner as to extend backward and forward, in which front and rear end portions of the guidance shaft may pass through the respective vertical-plane portions, respectively, of a pair of "L" shaped brackets that are installed on front and rear end portions, respectively, of the base frame in such a manner as to be fixedly mounted thereon, thereby being fastened to each other for support.

In the vehicle-seat apparatus, a bracket that is hingedly coupled to a lower end portion of the front link and a sliding holder that is integrally combined with the bracket may be formed on the sliding member, and the sliding guidance member may be a sliding guide that holds the sliding holder to such a degree that backward and forward movements of the sliding holder are guided.

In the vehicle-seat apparatus, a striker that is removably hingedly coupled to the lower end portion of the front link, thereby being combined therewith, and a slider that has an extension bracket which is integrally combined with the striker may be formed on the sliding member, and the sliding guidance member may be a rail that holds the slider to such a degree that backward and forward movements of the slider are guided.

Advantageous Effects

As described, with a vehicle-seat apparatus according to the present invention, the stability of a seat and the prevention of shaking thereof in an unfolded state can be achieved.

Specifically, a sliding member and a guidance member are configured to slide a lower end portion of a front link backward and forward, and thus the stable support of sliding can be achieved. Furthermore, with a shaft, a sleeve of the sliding member and a guidance shaft are combined with each other. With this configuration, a cost-saving advantage can be achieved.

Furthermore, according to the present invention, an intermediate link is configured to be additionally provided between a rear lower end portion of a main link and a rear support link, considering that a comparatively great force is applied for causing the rear support link directly supporting a seat to pivot. Thus, with a comparatively small angle and a comparatively small force, the rear support link can be smoothly caused to pivot. Therefore, as a whole, a seat can be folded or unfolded with a comparatively small force.

DESCRIPTION OF DRAWINGS

FIG. 1 is a side-view diagram illustrating a stepwise process of operating a vehicle-seat apparatus in the related art;

FIGS. 2 and 3 are front-view and rear-view perspective diagrams, respectively, each illustrating a vehicle-seat apparatus according to an embodiment of the present invention;

FIGS. 4 and 5 are front-view and rear-view perspective diagrams, respectively, each illustrating a folded state of the vehicle-seat apparatus in FIG. 2;

FIG. 6 is a perspective diagram illustrating a sliding member and a guidance shaft, essential constituent elements, that are separated from the seating apparatus in FIG. 4;

FIG. 7 is an enlarged perspective diagram illustrating essential parts in a folded state in FIG. 4;

FIGS. 8 to 10 are side-view diagrams illustrating a stepwise process of operating the vehicle-seat apparatus in FIG. 2;

FIG. 11 is a side-view diagram illustrating a vehicle-seat apparatus according to another embodiment of the present invention; and FIG. 12 is a side-view diagram illustrating a vehicle-seat apparatus according to still another embodiment of the present invention.

BEST MODE

Mode for Invention

A vehicle-seat apparatus 110 according to an embodiment of the present invention, as illustrated in FIGS. 2 and 3, is installed in a vehicle seat 100 that includes a seat cushion 101 which is horizontally installed and a seat back 102 which extends upward from a rear end portion of the seat cushion 101 and is installed in a manner that is rotatable forward with respect to the seat cushion 101.

The vehicle-seat apparatus 110 includes a front link 120 that has an upper end portion which is hingedly coupled to a front lower end portion of the seat cushion 101. A shaft 130, transversely extending, passes through a lower end portion of the front link 120, thereby being hingedly coupled thereto. The shaft 130 is inserted into a shaft support portion 142, thereby being hingedly coupled thereto. The shaft support portion 142 is formed in such a manner as to transversely pass through a hollow block 141 that constitutes a portion of a sliding member 140 (refer to FIG. 6). A sleeve 143 is integrally combined with a lower end portion of the block 141 by welding or the like. The sleeve 143 is formed to extend backward and forward with respect to the vehicle seat 100.

As illustrated in FIG. 6, for insertion, a guidance shaft 150 passes through the sleeve 143 of the sliding member 140. Accordingly, the sliding member 140 is slid backward and forward in a guided manner along the guidance shaft 150.

An intermediate sleeve 145 formed of synthetic resin is inserted into an internal space in the sleeve 143, thereby being combined therewith. Thus, the sleeve 143 and the guidance shaft 150 that are both metal are brought into direct contact with each other. This prevents friction noise and abrasion and makes a smooth sliding movement possible.

Both front and rear end portions of the guidance shaft 150 pass through the respective vertical-plane portions 161 and 171, respectively, of an L-shaped bracket 160 and 170, thereby being fastened to each other by a bolt-nut connection mechanism. Horizontal-plane portions 162 and 172 make up the respective lower end portions, respectively, of the brackets 160 and 170. As illustrated in FIGS. 2 and 8, the horizontal-plane portions 162 and 172 are installed by the bolt-nut connection mechanism on the respective front and rear end portions, respectively, of a base frame 180, in such a manner as to be fixedly mounted thereon. The base frame 180 is formed to extend backward and forward. The base frame 180 is installed on a bottom surface of an accommodation space S under the vehicle seat 100, in such a manner as to extend backward and forward.

With reference to FIGS. 2 and 3, a front end portion of an "L"-shaped main link 190 is hingedly coupled to a body of the front link 120. A rear upper end portion of the main link 190 is hingedly coupled to a lower end portion 191 of the seat back 102 (refer to FIG. 8).

A rear lower end portion of the main link 190, as illustrated in FIG. 3, is hingedly coupled to a front end portion of an intermediate link 210 with a shaft 200 in between. A rear end portion of the intermediate link 210 is hingedly coupled to a body of a rear support link 220 (refer to FIG. 8).

Normally, the rear support link 220 is formed in the shape of the letter L. A front upper end portion of the rear support link 220 is hingedly coupled to a rear portion of the seat cushion 101 (refer to FIG. 9). A rear lower end portion of the rear support link 220 is hingedly coupled to a fixation bracket 230 (refer to FIG. 8) that is fixedly installed on an upper end portion of a rear wall of the accommodation space S.

With the configuration described above, in a case where a user rotates the seat back 102 forward in order to accommodate the vehicle seat 100 in the unfolded position, which is illustrated in FIG. 8, the main link 190, as illustrated in FIG. 9, is pulled backward by the rear upper end portion 191 thereof that pivots backward together with the lower end portion of the seat back 102. Thus, the front link 120 pivots backward on an upper end portion thereof. While this is done, the sliding member 140 hingedly coupled to a lower end portion of the front link 120 is slid backward in a guided manner along the guidance shaft 150.

In this manner, as illustrated in FIG. 10, the vehicle seat 100 is accordingly accommodated into the accommodation space S in a state of being completely folded. At this time, the sliding member 140, as illustrated in FIG. 7, is slid along the guidance shaft 150 all the way up to a rear end portion thereof.

On the other hand, when the vehicle seat 100 sinks while changing from a state in FIG. 8 to a state in FIG. 9, the rear support link 220 hingedly coupled to the rear end portion of the seat cushion 101 descends along the descending main link 190, together with the intermediate link 210 hingedly coupled to the rear lower end portion of the main link 190. Then, the rear support link 220 pivots on a fixation shaft 231 of a fixation bracket 230. Then, as illustrated in FIG. 10, the rear support link 220 descends almost perpendicularly in a state where the vehicle seat 100 is completely folded (refer to FIGS. 4 and 5).

In order to return the vehicle seat 100 from the completely folded state to the unfolded state, in a case where, as illustrated in FIG. 10, the seat back is rotated backward, the main link 190 moves forward by the rear upper end portion 191 that pivots forward together with the lower end portion of the seat back 102. When this is done, the intermediate link 210 hingedly coupled to the body of the main link 190 is pulled up forward and then ascends together with the rear support link 220 while pivoting forward on the fixation shaft 231 of the fixation bracket 230.

The intermediate link 210 stops pivoting forward, when the seat back 102 rotates upward by an angle of approximately 90 degrees on the fixation shaft 231 in the unfolded state of the vehicle seat 100 that is illustrated in FIG. 8. Thus, with the addition of the intermediate link 210, the user can raise up the vehicle seat 100 by applying a relatively small amount of force.

FIG. 11 is a diagram illustrating a vehicle-seat apparatus according to another embodiment. In this vehicle-seat apparatus, a shaft 330, transversely extending, passes through a lower end portion of the front link 320, thereby being hingedly coupled thereto. Furthermore, the shaft 330 passes transversely through a bracket 341 that constitutes a portion of a sliding member 340, thereby being hingedly coupled thereto. A lower end portion of the bracket 341 is integrally combined with a sliding holder 342, and the sliding holder 342 is held to such a degree that it possibly passes backward and forward through a sliding guide 350. The sliding holder 342 is slid backward and forward in a guided manner.

FIG. 12 is a diagram illustrating a vehicle-seat apparatus according to still another embodiment. In this vehicle-seat apparatus, a striker 441 that constitutes one of a sliding member 440 is removably inserted into a nesting groove 421 formed in a lower end portion of a front link 420, thereby being hingedly coupled therewith. A lower end portion of the striker 441 is welded on an extension bracket 443 that extends from an upper end of a slider 442 and is integrally combined therewith, thereby being integrally combined therewith. The slider 442 is held to such a degree that it is slid backward and forward in a guided manner along a rail 450.

On the other hand, the above-described vehicle-seat apparatuses 110 according to the embodiment of the present invention are provided for helping a person of ordinary skill in the art to get a full understanding of the present invention. Equivalents of the elements disclosed in the specification and equivalents of the technical idea of the present invention fall within the scope of the present invention. The scope of the prevent invention should be determined by the following claims.

The invention claimed is:

1. A vehicle-seat apparatus adapted to be installed in a vehicle seat having a seat cushion and a seat back that extends upward from a rear end portion of the seat cushion and is capable of rotating forward with respect to the seat cushion, the vehicle-seat apparatus comprising:
a front link of which an upper end portion is hingedly coupled to a front portion of the seat cushion;
a sliding member that is hingedly coupled to a lower end portion of the front link;
a sliding guidance member that is fixedly installed on a bottom surface of an accommodation space formed under the vehicle seat, in such as manner as to extend backward and forward, and guides linear backward and forward movements of the sliding member;
an L-shaped main link of which a front end portion is hingedly coupled to a body of the front link and of which a rear upper end portion is hingedly coupled to a lower end portion of the seat back;
a fixation bracket that is fixedly installed on an upper end portion of a rear wall of the accommodation space; and
a rear support link of which a front upper end portion is hingedly coupled to a rear portion of the seat cushion, and of which a rear lower end portion is hingedly coupled to the fixation bracket.

2. The vehicle-seat apparatus according to claim 1, wherein a shaft support portion, extending transversely, that is hingedly coupled to the lower end portion of the front link and a sleeve, extending backward and forward, that is integrally combined with the shaft support portion are formed in the sliding member and on the sliding member, respectively, and
the sliding guidance member is a guidance shaft that, for insertion, passes through the sleeve.

3. The vehicle-seat apparatus according to claim 2, further comprising:
an intermediate link of which a front end portion is hingedly coupled to a rear lower end portion of the main link and of which a rear end portion is hingedly coupled to a body of the rear support link, and which thus causes the rear support link to pivot on the fixation bracket according to ascending and descending movements of the main link.

4. The vehicle-seat apparatus according to claim 2, further comprising:
an intermediate sleeve, formed of synthetic resin, that is inserted into an internal space of the sleeve on the sliding member, thereby being combined therewith and thus serves as a connection between the sleeve and the guidance shaft.

5. The vehicle-seat apparatus according to claim 2, further comprising:
a base frame that is installed on a bottom surface of the accommodation space in such a manner as to extend backward and forward, wherein
front and rear end portions of the guidance shaft pass through the respective vertical-plane portions, respectively, of a pair of "L" shaped brackets that are installed on front and rear end portions, respectively, of the base frame in such a manner as to be fixedly mounted thereon, thereby being fastened to each other for support.

6. The vehicle-seat apparatus according to claim 1, wherein a bracket that is hingedly coupled to a lower end portion of the front link and a sliding holder that is integrally combined with the bracket are formed on the sliding member, and
the sliding guidance member is a sliding guide that holds the sliding holder to such a degree that backward and forward movements of the sliding holder are guided.

7. The vehicle-seat apparatus according to claim 1, wherein a striker that is removably hingedly coupled to the lower end portion of the front link, thereby being combined therewith, and a slider that has an extension bracket which is integrally combined with the striker are formed on the sliding member, and
the sliding guidance member is a rail that holds the slider to such a degree that backward and forward movements of the slider are guided.

\* \* \* \* \*